(12) United States Patent
Ueda

(10) Patent No.: US 7,667,958 B2
(45) Date of Patent: Feb. 23, 2010

(54) DISPLAY UNIT

(75) Inventor: Takashi Ueda, Osaka (JP)

(73) Assignee: Cateye Co., Ltd., Osaka (JP)

( * ) Notice: Subject to any disclaimer, the term of this patent is extended or adjusted under 35 U.S.C. 154(b) by 0 days.

(21) Appl. No.: 12/156,525

(22) Filed: Jun. 2, 2008

(65) Prior Publication Data

US 2008/0304221 A1    Dec. 11, 2008

(30) Foreign Application Priority Data

Jun. 8, 2007    (JP)    ............... 2007-152738

(51) Int. Cl.
    *G06F 1/16*    (2006.01)
(52) U.S. Cl. .............. 361/679.26; 361/679.56
(58) Field of Classification Search ........... 361/679.26, 361/679.29, 679.3; 345/636; 73/856
    See application file for complete search history.

(56) References Cited

U.S. PATENT DOCUMENTS

| | | | | |
|---|---|---|---|---|
| 4,479,693 A * | 10/1984 | Uyeda et al. | ................ | 439/527 |
| 4,819,217 A * | 4/1989 | Houlihan | ................ | 368/10 |
| 4,881,187 A * | 11/1989 | Read | ................ | 200/5 D |
| 6,069,788 A * | 5/2000 | Masui | ................ | 361/679.55 |
| 6,154,690 A * | 11/2000 | Coleman | ................ | 701/1 |
| 6,204,752 B1 * | 3/2001 | Kishimoto | ................ | 340/432 |
| 6,430,040 B1 * | 8/2002 | Masui | ................ | 361/679.55 |
| 6,631,656 B2 * | 10/2003 | Ase et al. | ................ | 74/551.8 |
| 6,757,157 B2 * | 6/2004 | Lammintaus et al. | .... | 361/679.3 |
| 6,930,878 B2 * | 8/2005 | Brackett et al. | ........ | 361/679.03 |
| 7,055,394 B2 * | 6/2006 | Kinoshita | ................ | 73/856 |
| 7,379,798 B2 * | 5/2008 | Takeda et al. | ................ | 701/29 |
| 7,490,965 B2 * | 2/2009 | Okada et al. | ................ | 362/473 |
| 2004/0095362 A1 * | 5/2004 | Koumoto | ................ | 345/636 |
| 2007/0170338 A1 * | 7/2007 | Ueda et al. | ................ | 248/346.03 |

FOREIGN PATENT DOCUMENTS

| | | |
|---|---|---|
| JP | 05-008637 U | 2/1993 |
| JP | 2005-266920 A | 9/2005 |
| JP | 2005-350064 A | 12/2005 |

* cited by examiner

*Primary Examiner*—Lisa Lea-Edmonds
(74) *Attorney, Agent, or Firm*—Olson & Cepuritis, Ltd.

(57) ABSTRACT

A display unit comprises a display unit body, a display part displaying information, a first button so provided as to protrude from the bottom surface of display unit body and a second button provided on the upper surface of display unit body. A first function is realized by pressing a region of the upper surface of display unit body adjacent to second button to rotate display unit body and to push first button into display unit body. A second function different from the first function is realized by pressing second button with a prescribed load to rotate display unit body and to push first button into display unit body.

6 Claims, 7 Drawing Sheets

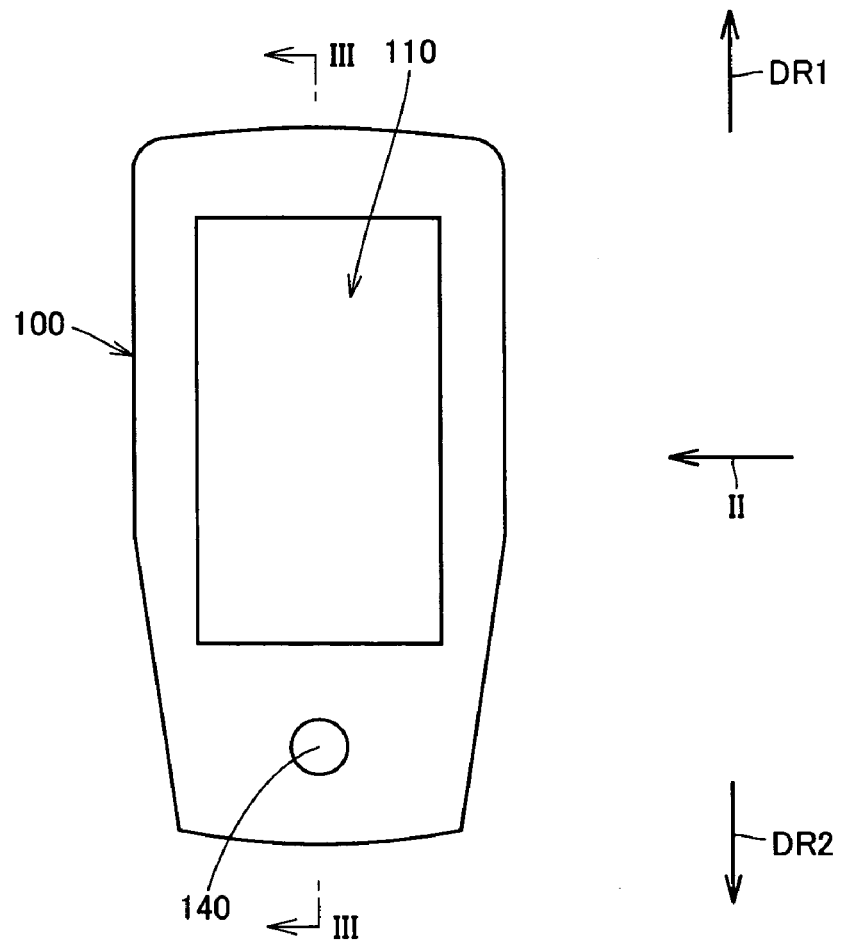
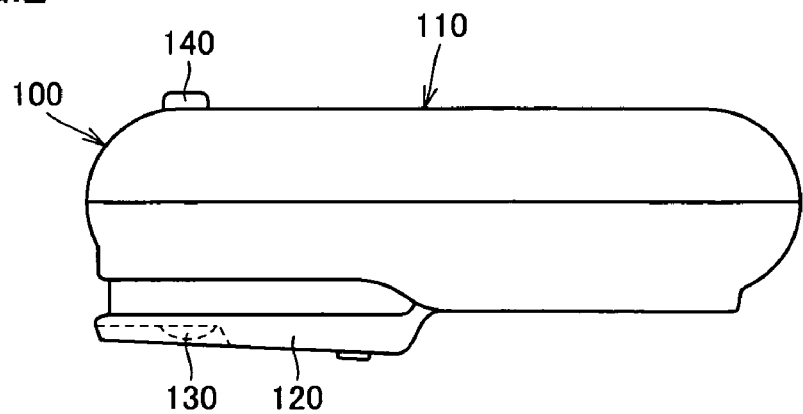

DISPLAY UNIT

BACKGROUND OF THE INVENTION

1. Field of the Invention

The present invention relates to a display unit, and more particularly, it relates to a display unit having buttons on the upper and bottom surfaces of the body thereof.

2. Description of the Background Art

A display unit capable of displaying various data is known in general.

For example, Japanese Patent Laying-Open No. 2005-350064 discloses a display unit for a bicycle comprising a bracket attachable to the frame of the bicycle, a display part and a control part. The control part changes at least one of the three attributes of color, i.e. the hue, the chroma and the brightness of the backlight in response to received data.

On the other hand, each of Japanese Patent Laying-Open No. 2005-266920 and Japanese Utility Model Laying-Open No. 05-008637 (1993), for example, describes a structure capable of realizing a plurality of functions in response to a plurality of buttons simultaneously or individually pressed.

Japanese Patent Laying-Open No. 2005-266920 describes a key input unit comprising a main key top and an auxiliary key top adjacent to each other. The user of this unit can input information with a built-in input function by individually pressing the main key top or the auxiliary key top, or simultaneously pressing both of the main key top and the auxiliary key top.

Japanese Utility Model Laying-Open No. 05-008637 describes a structure formed by arranging three divided key buttons to be adjacent to each other so that the three key buttons combinedly serve as specific numerical input means while the divided individual key buttons serve as different numerical input means related to specific numerical values respectively.

In the display unit described in Japanese Patent Laying-Open No. 2005-350064, the user may wish to perform a plurality of functions such as that for switching the display and that for resetting a display state, for example, with a simple button operation.

While each of Japanese Patent Laying-Open No. 2005-266920 and Japanese Utility Model Laying-Open No. 05-008637 discloses a unit capable of realizing a plurality of functions in response to a plurality of buttons simultaneously or individually pressed, the plurality of buttons are provided to be adjacent to each other, and hence it may not be possible for the user to simply select any of the plurality of functions with one finger.

SUMMARY OF THE INVENTION

An object of the present invention is to provide a display unit capable of realizing at least two functions through a simple operation with one finger.

The display unit according to the present invention comprises a body having an upper surface and a bottom surface opposed to each other, a display part provided on the upper surface of the body for displaying information, a support provided on the bottom surface of the body for rotatably supporting the body, a first button so provided as to protrude from the bottom surface of the body toward the support and a second button provided on the upper surface of the body. A first function is realized by pressing a region of the upper surface of the body adjacent to the second button, rotating the body and pushing the first button into the body by the support, and a second function different from the first function is realized by pressing the second button with a prescribed load, rotating the body and pushing the first button into the body by the support.

According to the aforementioned structure, by pressing the second button serving as an auxiliary button, the first button serving as a main button can be continuously and immediately pushed into the body, whereby the user of the display unit can select the first or second function by pressing the region of the body adjacent to the second button from above or pressing the second button from above. Thus, the user may not operate two buttons with two or more fingers in order to select the first and second functions, but can select at least two functions by a simple operation with one finger.

In the aforementioned display unit, the second button is preferably so provided as to protrude from the upper surface of the body.

Thus, the user can determine the position of the second button by touching the surface of the body without visual confirmation.

In the aforementioned display unit, the operating load for the second button is preferably lower than the operating load for the first button.

Thus, the user can select the first or second function by simply changing the digital pressing position, without strong awareness of pressing load of the second button.

According to another aspect of the present invention, the center of gravity of the aforementioned display unit is opposite to the first button with respect to the fulcrum of the support supporting the body.

According to still another aspect of the present invention, the aforementioned display unit further comprises a power source supplying power for displaying information on the display part, and the center of gravity of the power source is opposite to the first button with respect to the fulcrum of the support supporting the body.

Thus, the first button can be prevented from being pushed into the body by vertical vibration so that the display unit can be prevented from a false operation as a result, according to either aspect.

According to a further aspect of the present invention, the aforementioned display unit is secured to a handlebar, frame or stem of a two-wheeler.

When the rider of the two-wheeler wears gloves, it is difficult to perform a complicated operation. According to the aforementioned display unit, the rider can select the first or second function by a simple operation with one finger, thereby a particularly high operability can be achieved in operability.

According to the present invention, as hereinabove described, a display unit capable of realizing at least two functions by a simple operation with one finger can be achieved.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a top plan view of a body of a display unit according to an embodiment of the present invention;

FIG. 2 illustrates the body shown in FIG. 1 as viewed along arrow II;

DESCRIPTION OF THE PREFERRED EMBODIMENTS

Figure 3:
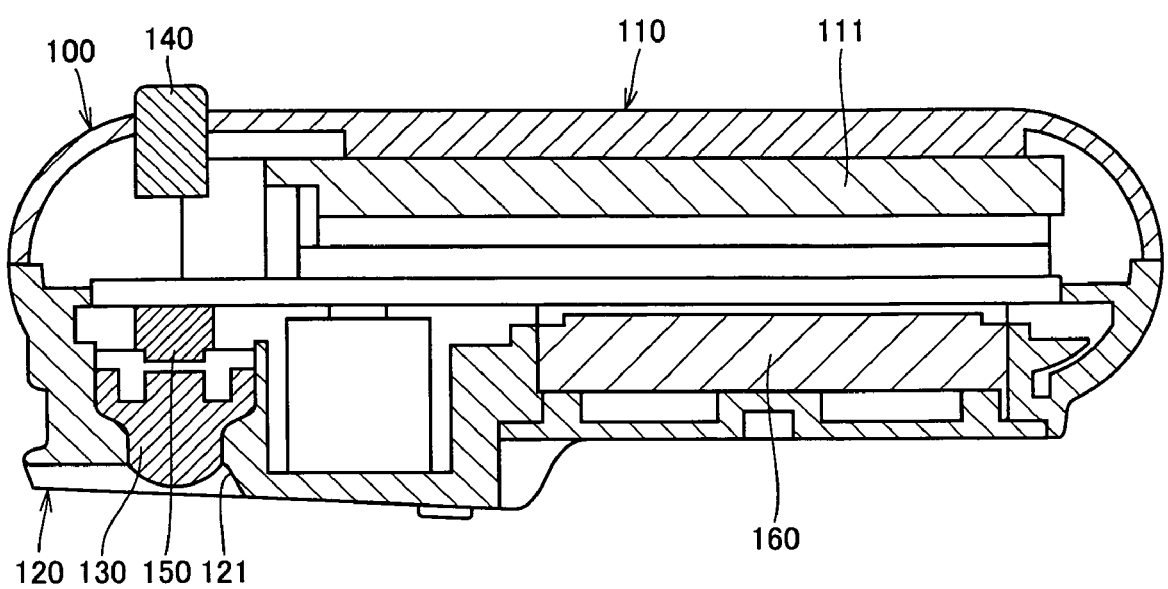
FIG. 3 is a sectional view taken along the line III-III in FIG. 1.

An embodiment of the present invention is now described. Identical or corresponding portions are denoted by the same reference numerals, and redundant description may not be repeated.

When numbers, quantities etc. are mentioned in the following description of the embodiment, the scope of the present invention is not necessarily restricted to these numbers, quantities etc., unless otherwise stated. In the following description of the embodiment, further, the respective components are not necessarily essential to the present invention, unless otherwise stated. If a plurality of embodiments are present in the following description, it is intended from the first to properly combine the structures of the respective embodiments with each other, unless otherwise stated.

FIG. 1 is a top plan view of a body of a display unit according to an embodiment of the present invention. FIG. 2 illustrates the body shown in FIG. 1 as viewed along arrow II, and FIG. 3 is a sectional view taken along the line III-III in FIG. 1.

Referring to FIGS. 1 to 3, a display unit body 100 included in the display unit according to this embodiment includes a display part 110 displaying various data, an engaging part 120 engaging with a securing tool described later, a first button 130 (main button) so provided as to protrude from the bottom surface of display unit body 100, a second button 140 (auxiliary button) so provided as to protrude from the upper surface of display unit body 100, a tact switch 150 provided above first button 130 and a battery 160.

Display unit body 100 is attached to a handlebar, frame or stem of a bicycle, for example. Referring to FIG. 1, arrows DR1 and DR2 correspond to the front and rear sides of the bicycle respectively. Display part 110 has a liquid crystal display 111. Liquid crystal display 111 displays data such as the traveling speed, the traveling time, the travel distance, the time of day, the average speed and the maximum speed of the bicycle, for example.

Engaging part 120 has a recess 121, and first button 130 is so provided as to protrude from the bottom surface of recess 121. When first button 130 is pushed into display unit body 100, tact switch 150 operates. First and second buttons 130 and 140 are provided on a rear region of display unit body 100. The functions of first and second buttons 130 and 140 are described later in detail. Battery 160 is arranged on a position shifted along arrow DR1 (frontward) from the longitudinal center of display unit body 100.

Figure 4:
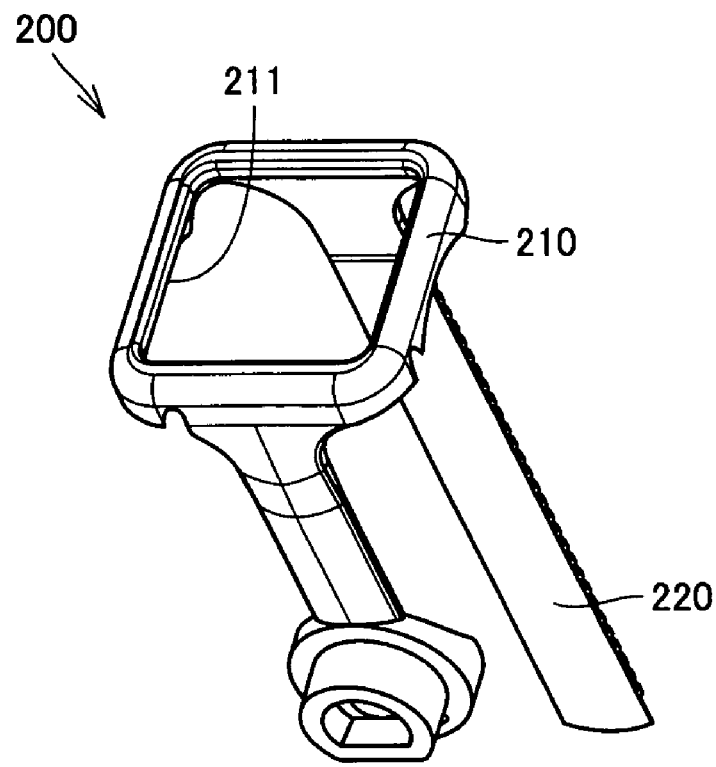
FIG. 4 is a perspective view showing a securing tool for securing the body of the display unit shown in FIGS. 1 to 3 to a bar.
Figure 5:
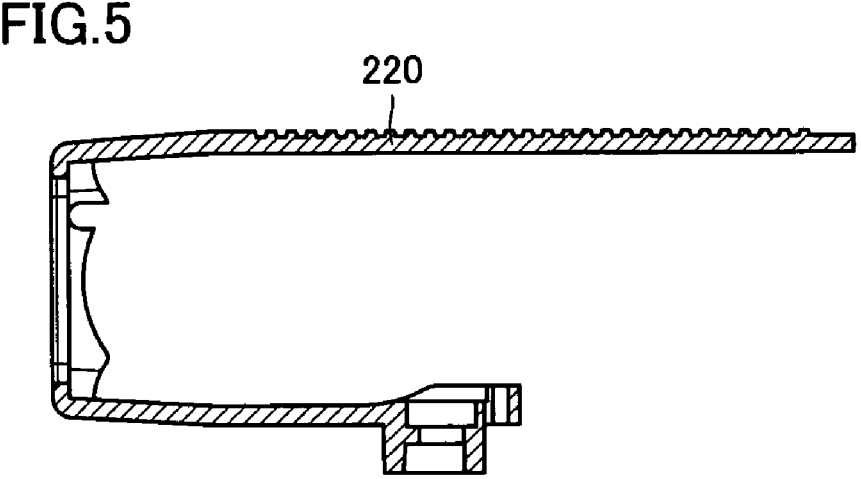
FIG. 5 is a side sectional view of the securing tool shown in FIG. 4.
Figure 6:
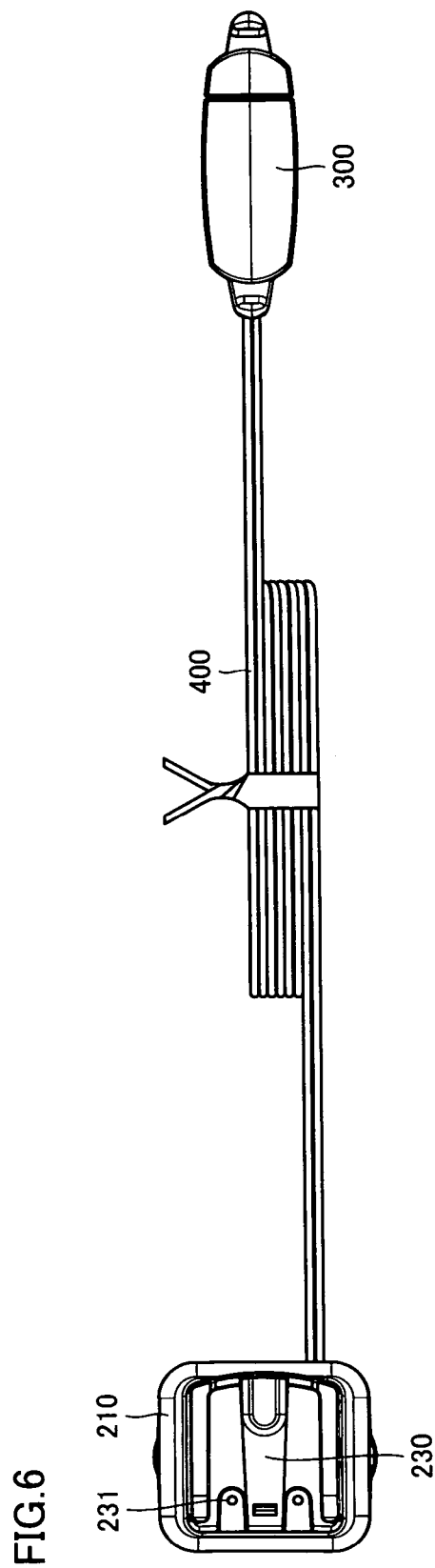
FIG. 6 illustrates a sensor attached to the securing tool shown in FIGS. 4 and 5.

FIG. 4 is a perspective view showing a securing tool 200 for securing display unit body 100 shown in FIGS. 1 to 3 to a bar. FIG. 5 is a side sectional view of securing tool 200 shown in FIG. 4. FIG. 6 illustrates a sensor 300 attached to securing tool 200 shown in FIGS. 4 and 5.

Referring to FIGS. 4 to 6, securing tool 200 includes a securing tool body 210, a band 220 wound on the handlebar or the like and a fit member 230. Securing tool body 210 has an opening 211. Fit member 230 is fitted into opening 211, to be integrated with securing tool body 210. Opening 211 and fit member 230 are substantially squared, and fit member 230 can be attached to opening 211 also in a state rotated by 90° from that shown in FIG. 6. One end of a cable 400 is connected to fit member 230. Another end of cable 400 is connected to sensor 300 (speed sensor, for example). Data fetched from sensor 300 is transmitted to fit member 230 through cable 400. Display unit body 100 fetches this data through an electrode 231 of fit member 230, and displays the data on display part 110.

Figure 7:
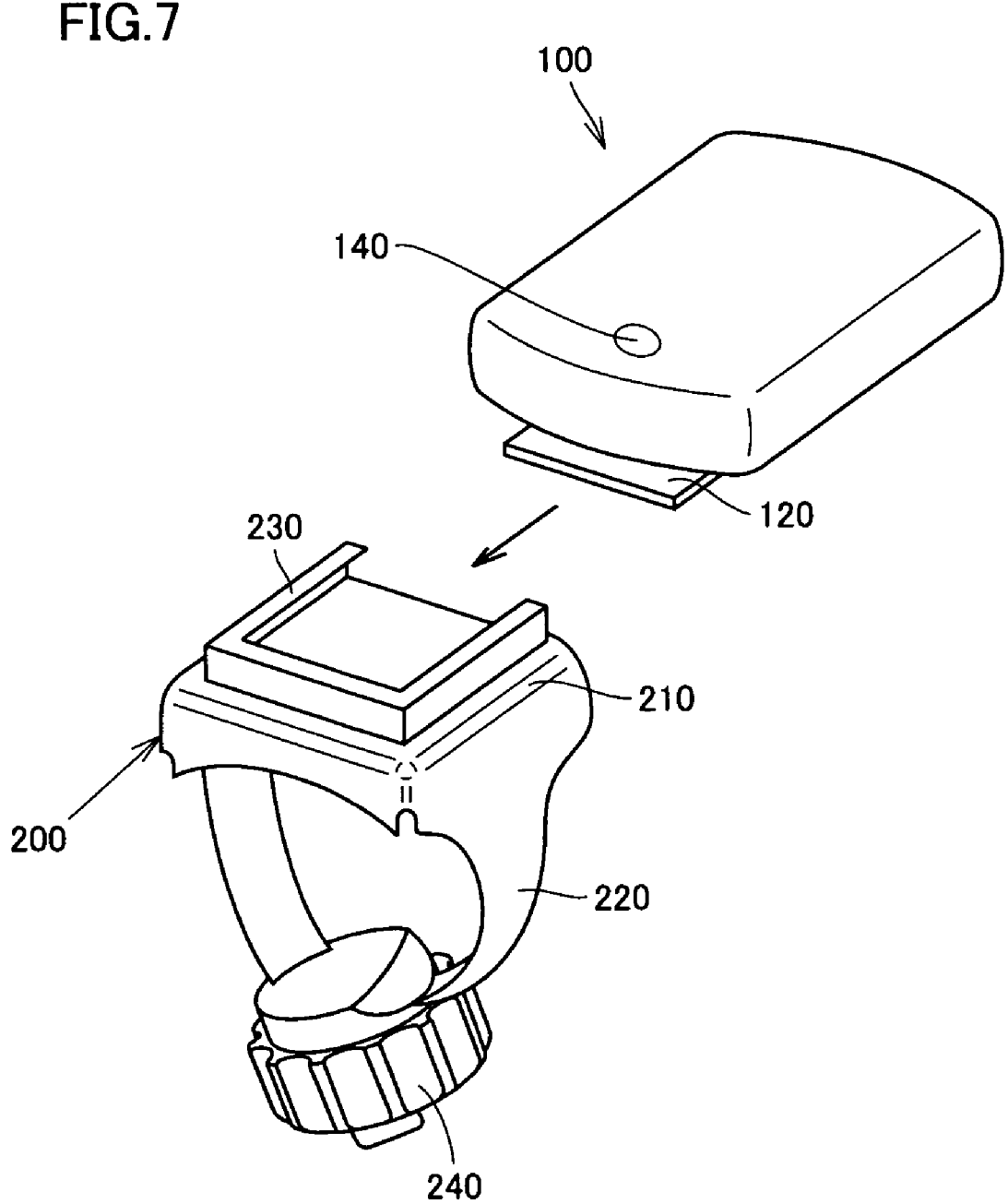
FIG. 7 illustrates a state of attaching the body of the display unit to the securing tool shown in FIGS. 4 and 5.
Figure 8:
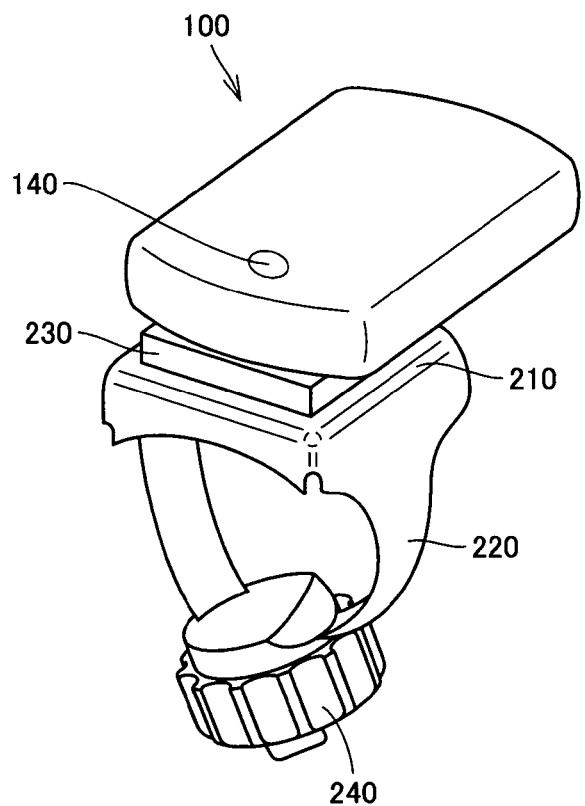
FIG. 8 illustrates a state after attaching the body of the display unit to the securing tool shown in FIGS. 4 and 5.

FIG. 7 illustrates a state of attaching display unit body 100 to securing tool 200. FIG. 8 illustrates a state after attaching body 100 to securing tool 200.

Referring to FIGS. 7 and 8, body 100 is slid along arrow in FIG. 7, so that engaging part 120 of display unit body 100 engages with fit member 230 of securing tool 200. Thus, display unit body 100 is attached to securing tool 200. As shown in FIGS. 7 and 8, securing tool 200 is a worm-gear type securing tool having a rotational operating part 240. In other words, band 220 can be tightened or loosened by rotating rotational operating part 240.

Figure 9:
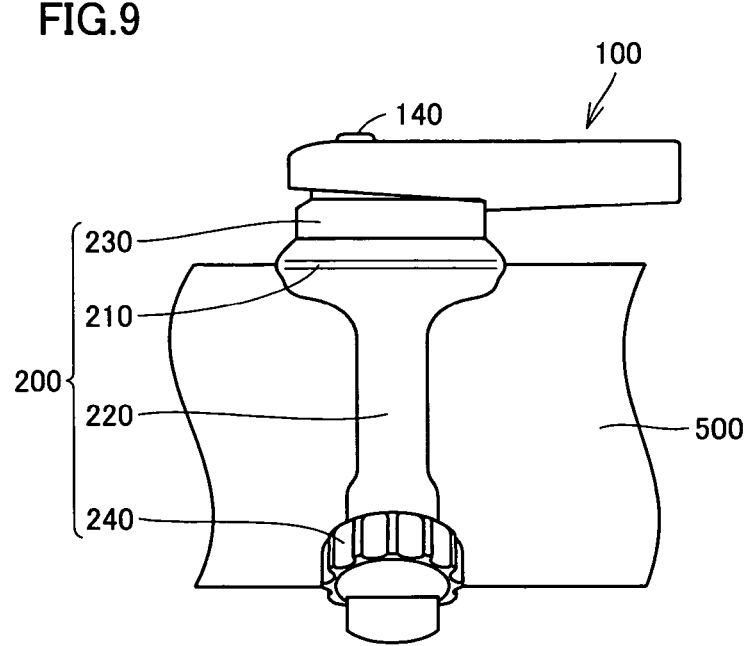
FIG. 9 illustrates the display unit according to the embodiment of the present invention attached to a bar.

FIG. 9 illustrates the display unit, including display unit body 100 and securing tool 200, attached to a bar 500. As shown in FIG. 9, the display unit is attached to bar 500 by winding band 220 of securing tool 200 on bar 500 and clamping bar 500. The display unit, attached to bar 500 (stem, for example) extending along the longitudinal direction of the bicycle in FIG. 9, can alternatively be attached to another bar (handlebar, for example) extending along the horizontal direction of the bicycle by attaching fit member 230 to securing tool body 210 in the state rotated by 90°, as hereinabove described.

A method of operating the display unit according to this embodiment is now described with reference to FIGS. 10 and 11. The user of the display unit according to this embodiment can select a plurality of functions by pressing display unit body 100 or second button 140 from above.

Figure 10:
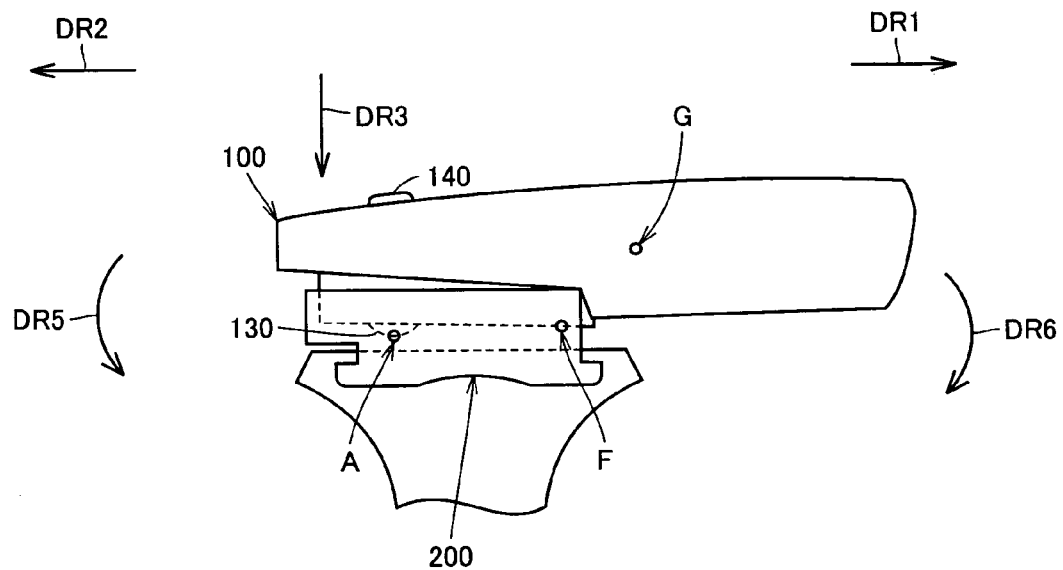
FIG. 10 illustrates an operation for realizing a first function in the display unit according-to the embodiment of the present invention.

FIG. 10 illustrates an operation for realizing a first function of the display unit. Referring to FIG. 10, display unit body 100 is rotatably supported on securing tool 200. In other words, display unit body 100 is rotatable along arrows DR5 and DR6. In order to realize the first function of the display unit, the user presses a region of display unit body 100 adjacent to second button 140 along arrow DR3. Thus, display unit body 100 rotates along arrow DR5, securing tool 200 pushes first button 130 into display unit body 100, and tact switch 150 operates. Thus, the first function of the display unit is realized.

Figure 11:
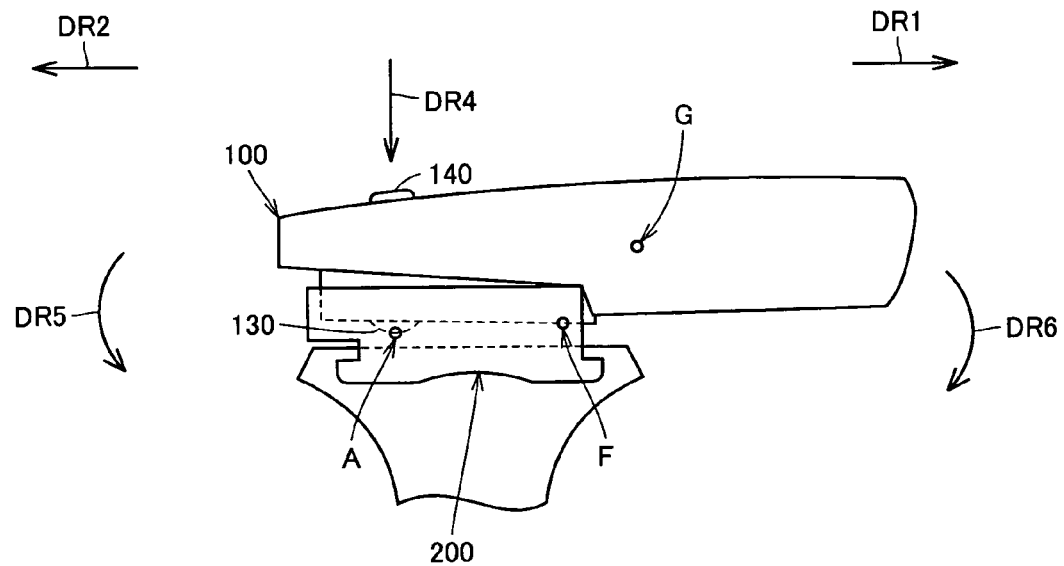
FIG. 11 illustrates an operation for realizing a second function in the display unit according to the embodiment of the present invention.

FIG. 11 illustrates an operation for realizing a second function of the display unit. Referring to FIG. 11, the user presses second button 140 along arrow DR4, in order to realize the second function of the display unit. Thus, display unit body 100 rotates along arrow DR5, securing tool 200 pushes first button 130 into display unit body 100, and tact switch 150 operates. At this time, the second button 140 is being pressed down. Thus, the second function different from the aforementioned first function is realized. In other words, second button 140 corresponds to an auxiliary key for realizing the second function of the display unit.

While operations of switching the display contents (the time of day, the traveling distance, the traveling time, the average speed, the maximum speed, the heart rate etc.), switching measurement modes (the traveling distance, the traveling time, the average speed, the maximum speed, the heart rate etc.), resetting measured data (the traveling distance, the traveling time, the average speed, the maximum speed, the heart rate etc.), starting/stopping measurement (measurement of the lap time etc.) and turning on the backlight are conceivable as the aforementioned first and second functions, it is of course also intended to realize other functions by the aforementioned operations. The aforementioned display unit may be applied to a device realizing at least three functions. According to a typical example, the display unit realizes the operation of switching the measurement modes as the "first function" when the user presses the region adjacent to second button 140 to push down display unit body 100 (i.e., when only first button 130 is pushed into display unit body 100), realizes the operation of starting/stopping the measurement when the user presses second button 140 to push down display unit body 100 (i.e., when both of first and second buttons 130 and 140 are pushed into display unit body 100), and realizes the operation of resetting the measured data when the user continuously presses the region adjacent to second button 140 for at least a prescribed time (i.e., when only first button 130 is continuously pushed into display unit body 100).

As shown in FIGS. 10 and 11, the center of gravity G of the display unit, the fulcrum F of securing tool 200 supporting display unit body 100 and the center A of first button 130 line up in this order from the forward end of the bicycle along the longitudinal direction of the bicycle (along arrows DR1 and DR2) in the display unit according to this embodiment. Thus, moment by the gravity acts on display unit body 100 along arrow DR6, to cancel moment along arrow DR5. Therefore, display unit body 100 can be prevented from rotating along arrow DR5 due to vertical vibration and causing a false operation of tact switch 150 in a traveling state of the bicycle. Center of gravity G of the display unit can be adjusted by arrangement of battery 160, for example. According to this embodiment, the center of gravity of battery 160 is located frontward beyond fulcrum F of securing tool 200 supporting display unit body 100, thereby shifting center of gravity G of the display unit frontward.

In the traveling state of the bicycle (particularly when the rider of the bicycle wears gloves), it is difficult to perform a complicated operation on the display unit. In the display unit according to this embodiment, the user of this display unit can easily select the first or second function by pressing the region of display unit body 100 adjacent to second button 140 from above or pressing second button 140 from above. Therefore, the user does not need to operate two buttons in order to select the first and second functions respectively, but can select at least two functions by a simple operation with one finger.

Second button 140 is so provided as to protrude from the upper surface of display unit body 100, whereby the user can determine the position of second button 140 by touching the surface of the body without visual confirmation.

The operating loads for (resistance for pushing) first and second buttons 130 and 140 are so properly adjusted that tact switch 150 is prevented from a false operation resulting from vibration and first and second buttons 130 and 140 are not hard to operate due to excessive loads. According to this embodiment, the operating load for second button 140 is set lower than the operating load for first button 130. Thus, the user can select the first or second function by simply changing the pressing position, without strong awareness of pressing load of second button 140.

The aforementioned contents are summarized as follows: The display unit according to this embodiment, attached to bar 500, comprises display unit body 100 having the upper and bottom surfaces opposed to each other, display part 110 provided on the upper surface of display unit body 100 for displaying information, securing tool 200 provided on the bottom surface of display unit body 100 for serving as a "support" rotatably supporting display unit body 100 and securing display unit body 100 to bar 500, first button 130 so provided as to protrude from the bottom surface of display unit body 100 toward securing tool 200 and second button 140 provided on the upper surface of display unit body 100. In the aforementioned display unit, the first function is realized by pressing the region of the upper surface of display unit body 100 adjacent to second button 140 to rotate display unit body 100 along arrow DR5 and to push first button 130 with securing tool 200 into display unit body 100 (FIG. 10). In the aforementioned display unit, further, the second function different from the first function is realized by pressing second button 140 with a prescribed load to rotate display unit body 100 along arrow DR5 and to push first button 130 with securing tool 200 into display unit body 100 (FIG. 11).

Although the present invention has been described and illustrated in detail, it is clearly understood that the same is by way of illustration and example only and is not to be taken by way of limitation, the scope of the present invention being interpreted by the terms of the appended claims.

What is claimed is:

1. A display unit comprising:
    a body having an upper surface and a bottom surface opposed to each other;
    a display part provided on the upper surface of said body for displaying information;
    a support provided on the bottom surface of said body for rotatably supporting said body;
    a first button so provided as to protrude from the bottom surface of said body toward said support; and
    a second button provided on the upper surface of said body, wherein
    a first function is realized by pressing a region of the upper surface of said body adjacent to said second button, rotating said body and pushing said first button into said body by said support and
    a second function different from said first function is realized by pressing said second button with a prescribed load, rotating said body and pushing said first button into said body by said support.

2. The display unit according to claim 1, wherein said second button is so provided as to protrude from the upper surface of said body.

3. The display unit according to claim 1, wherein the first button and the second button each have an operating load, and the operating load for said second button is lower than the operating load for said first button.

4. The display unit according to claim 1, wherein the display unit has a center of gravity, the support said body having a fulcrum, and the center of gravity of said display unit is opposite to said first button with respect to the fulcrum of said support supporting said body.

5. The display unit according to claim 1, further comprising a power source supplying power for displaying information on said display part, wherein said power source has a center of gravity and the support supporting said body has a fulcrum and wherein the center of gravity of said power source is opposite to said first button with respect to the fulcrum of said support supporting said body.

6. The display unit according to claim 1, secured to a handlebar, frame or stem of a two-wheeler.

* * * * *